May 25, 1965     T. LOBERG     3,185,389
RESILIENT MOUNTING MEANS FOR A MACHINE OR THE LIKE
Filed Dec. 19, 1962     2 Sheets-Sheet 1

INVENTOR.
TORSTEN LOBERG
BY Eric Y. Munson

May 25, 1965  T. LOBERG  3,185,389
RESILIENT MOUNTING MEANS FOR A MACHINE OR THE LIKE
Filed Dec. 19, 1962  2 Sheets-Sheet 2
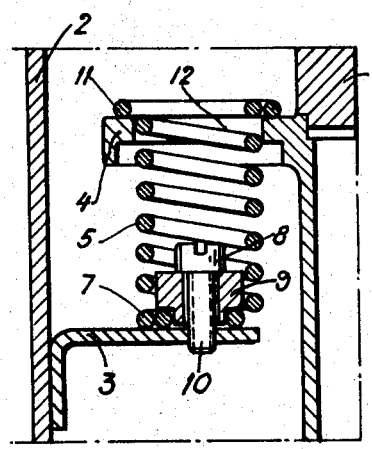
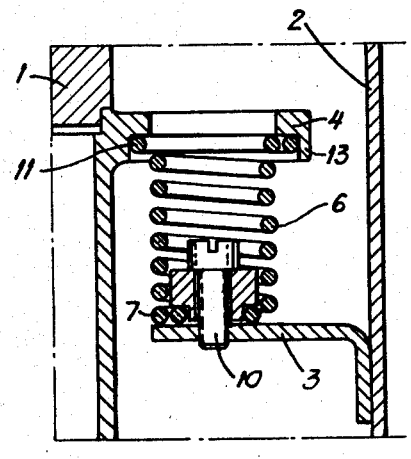
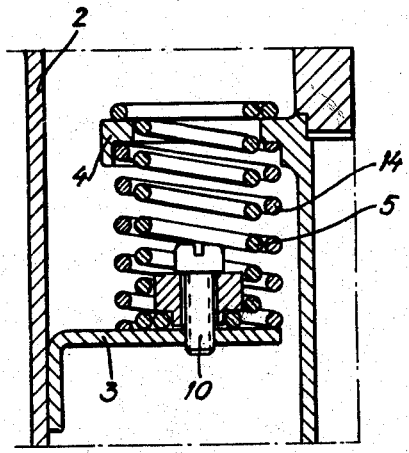
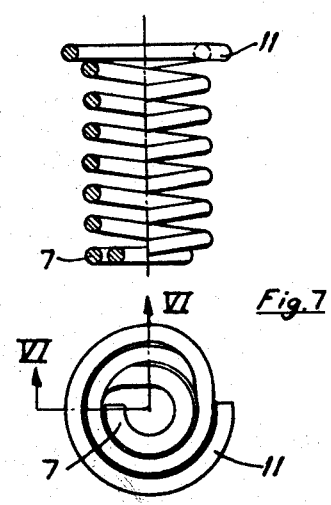
INVENTOR.
TORSTEN LOBERG
BY Eric Y. Munson United States Patent Office 3,185,389
Patented May 25, 1965

3,185,389
RESILIENT MOUNTING MEANS FOR A
MACHINE OR THE LIKE
Torsten Loberg, Norrkoping, Sweden, assignor to Stal
Refrigeration Aktiebolag, Norrkoping, Sweden, a corporation of Sweden
Filed Dec. 19, 1962, Ser. No. 245,878
Claims priority, application Sweden, Jan. 2, 1962, 4/62
6 Claims. (Cl. 230—235)

The present invention relates to means for resiliently mounting an apparatus, a machine or the like, such as for example, a compressor, on a supporting structure by means of a combination of both tension and compression springs that are interposed between brackets provided on the respective parts. The invention is mainly characterized in that the tension springs are formed with flat end turns or convolutions, one of these end turns being spirally extended inwardly in a plane so as to form a stop for the head of a screw or washer under the same, with the screw being introduced through said end turn and locked to one bracket, while the other end turn of the spring is spirally bent outwards in a plane in a manner to form a stop for the spring, the body of which spring is extended through an opening in the other bracket, said opening having a diameter smaller than that of the outwardly-bent turn or convolution on the spring.

It is an object of the invention to provide a spring mounting means for a compressor and the like so arranged that when the compressor is subjected to forces likely to impart a rocking movement to it such as might be caused by the torque of a residual unbalance in the crankshaft system, such movement will be resisted by several springs and if the compressor should be subjected to a torque acting in a horizontal plane, the torque will be absorbed by all of the springs in the mounting, thereby materially restricting any turning movement of the compressor.

It is an object of the invention to provide a resilient mounting means wherein a compressor or the like is provided with a plurality of radially-extending brackets disposed over brackets mounted on a compressor-enclosing housing, and with compression springs disposed between some of the housing brackets and some of the compressor brackets, and with tension springs arranged between the remainder of the housing brackets and the remainder of the compressor brackets.

It is also an object of the invention to provide a resilient mounting in which compression springs are concentrically arranged around tension springs, and in which brackets located respectively on a compressor and a housing therefor are employed as mounting means for both types of springs and in which both types of springs are substantially the same in shape and in unstressed length.

With these and other objects to be hereinafter set forth in view, I have devised the arrangement of parts to be described and more particularly pointed out in the claims appended hereto.

In the accompanying drawing, wherein an illustrative embodiment of the invention is disclosed, FIG. 1 is a longitudinal sectional view through a compressor, showing the improved mounting means;

FIG. 3 is a longitudinal sectional view, taken on the line III—III of FIG. 2 and showing a tension spring in position;

FIG. 4 is a sectional view, taken substantially on the line IV—IV of FIG. 2, looking in the direction of the arrows, and showing a compression spring in position disposed between two brackets, or one on the housing and one on the compressor;

FIG. 5 is a longitudinal sectional view showing an arrangement wherein a tension spring is surrounded by a compression spring;

FIG. 6 is an elevational view, partly in section of one of the springs, the compression and tension springs being substantially similar in shape and in unstressed length; and FIG. 7 is a top plan view of the spring.

Figure 1:
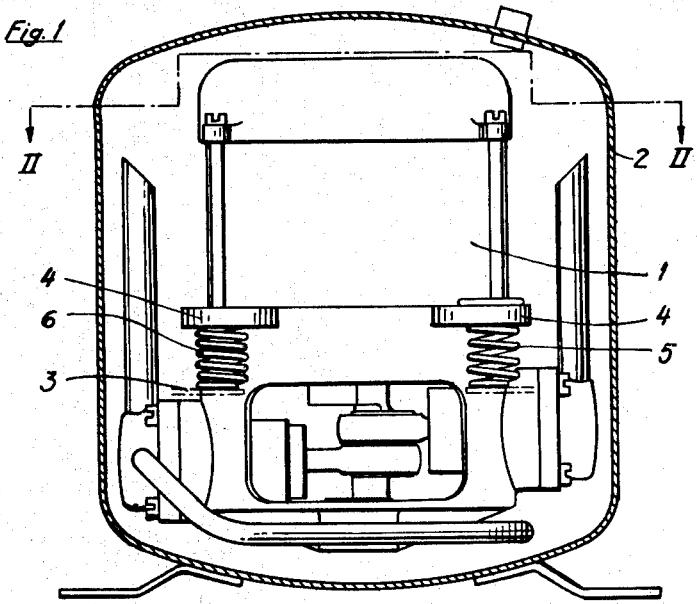

Referring to the drawing, 1 indicates for example, the compressor of a refrigerating apparatus, said compressor being mounted within a closed housing or casing 2. For mounting purposes, the casing or housing is provided with radially-disposed brackets, four in number being shown, and the compressor 1 is provided with a similar number of brackets 4 extending radially from it, the latter brackets being disposed above the brackets 3 on the housing. Interposed between diametrically oppositely disposed pairs of brackets 3 and 4 are tension springs 5 and compression springs 6, respectively.

Both the compression springs and the tension springs are of identical design, as shown in FIGS. 3, 4, 6 and 7. They have flat end turns or convolutions of which one end turn 7 is bent inwardly so as to form a stop for the head 8, or a washer 9 located beneath the head, of a screw 10 extended through said end turn and threaded in the bracket 3. The lower or smaller end turn 7 of the spring is thus engaged beneath the washer 9 as shown in FIGS. 3 and 4.

The opposite end turn or convolution 11 of the spring is bent outwardly in a manner to form a stop for the tension spring 5 which has its cylindrical portion extending through an opening 12 in the bracket 4, the diameter of this opening being smaller than that of the end turn or convolution 11.

The compression spring 6, as shown in FIG. 4, is arranged between the brackets 3 and 4. This spring 6, at its lower end is fastened to the bracket 3 in the same manner as is the tension spring 5. At its top end the spring is guided relatively to the bracket 4 by its outwardly-bent end turn 11 being surrounded by an annular rim 13 formed on the bracket 4 around the opening 12. The end turn 11 thus rests in an annular seat provided in the under side of the bracket 4.

Due to the fact that the end turn 11 of the tension spring abuts against the top face of the bracket 4, and the end turn 11 of the compression spring abuts against and rests in the seat on the bottom face of the bracket 4, the tension spring 5 will be elongated while the compression spring will be compressed to a suitable extent.

Figure 2:
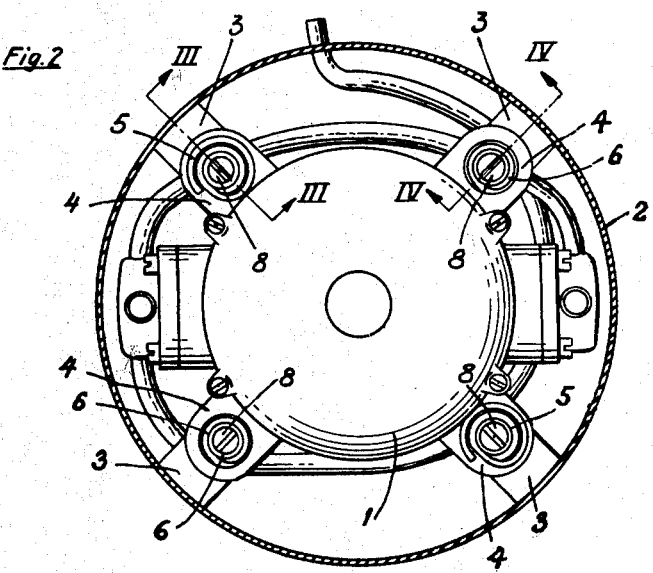
FIG. 2 is a cross sectional view, taken substantially on the line II—II of FIG. 1, looking in the direction of the arrows.

In the arrangement disclosed in FIGS. 1 and 2 two of the pairs of brackets 3, 4 receive the compression spings 6 while the remaining two pairs of brackets receive the tension springs 5. Thus, alternate springs are tension springs and the intervening springs are compression springs.

The mounting of a compressor or other apparatus as described herein results in the advantage that if the compressor should be subjected to forces tending to impart to the same a rocking movement in a vertical plane as caused, for example, by torques of a residual unbalance in a crankshaft system, then such movement will be counteracted by two of the four springs (one tension and one compression spring) thus rendering a mounting yieldable in this respect. If the compressor should be subjected to a torque acting in a horizontal plane, for example upon the starting up of the same, then such torque will be absorbed by the four springs in common, whereby the turning movement of the compressor will be effectively restricted.

The modified embodiment of FIG. 5 shows a tension spring according to FIG. 3. Concentrically surrounding the spring and held between the brackets 3 and 4 is a cylindrically shaped compression spring 14. When this embodiment is applied it is permissible to use three pairs of the brackets spaced 120° from each other, instead of the four shown in FIGS. 1 and 2. Any rocking movement of the compressor will be counteracted by one or two springs, while the starting torque will be counteracted by all of the six springs in common.

Having thus described a single embodiment of the invention, it is obvious that the same is not to be restricted thereto, but is broad enough to cover all structures coming within the scope of the annexed claims.

What I claim is:

1. A means for resiliently mounting a machine, such as a compressor or the like comprising, a compressor having a plurality of projecting brackets, a housing enclosing the compressor and having brackets disposed under those on the compressor, similar springs interposed between the compressor brackets and the housing brackets, some of said springs being compression springs and the other springs being tension springs, each spring having flat end turns, one of said end turns on each spring being engaged by a screw in each of the housing brackets, the second end turn on the tension springs engaging on the top of the compressor brackets, said compressor brackets each having an opening smaller in diameter than the end turn which engages against the top of the bracket.

2. A mounting means as provided for in claim 1, wherein the compression springs are identical in design to the tension springs but each of the compression springs has a turn at one end resting against the under side of each of the compressor brackets.

3. A mounting means as provided for in claim 1, wherein the springs are so disposed around the compressor so that alternate springs are tension springs and the intervening springs are compression springs.

4. A mounting means as provided for in claim 1, wherein there are arranged between the compressor brackets and housing brackets, both tension and compression springs, the compression springs being disposed concentrically around the tension springs and both the compression springs and tension springs being of an equal unstressed length.

5. A means for resiliently mounting a machine such as a compressor or the like, comprising a compressor provided with spaced-apart radially-extending brackets, each of said brackets being provided with an aperture on the under side of the bracket with an annular rim, a housing enclosing the compressor and provided with radial brackets disposed below and in alignment with those provided on the compressor, similar springs mounted between the compressor brackets and the housing brackets, each spring being attached at its lower end to the housing brackets, some of the springs being tension springs and the others being compression springs, the tension springs each having an upper flat convolution disposed over and resting against the upper side of a compressor bracket and the compression springs each having an upper flat convolution resting against the under surface of a compressor bracket and surrounded by the rim thereon.

6. A means for resiliently mounting a machine such as a compressor or the like comprising, a compressor having a plurality of projecting brackets, a housing enclosing the compressor and having brackets located under those on the compressor, springs interposed between the compressor brackets and the housing brackets, all of the springs being alike, some of said springs serving as tension springs and the other springs serving as compression springs, each tenison spring having a flat turn at each end, the lower one of said turns being bent inwardly in a plane to rest on top of one of the housing brackets, a screw passing through said lower turn and entering said bracket, the top end turn of said tension spring spiraling outwardly in a plane to rest on the top of one of the compressor brackets, said compressor bracket having an aperture of greater diameter than the body of the tension spring and of less diameter than the top turn of said spring, the body of the tension spring extending through said aperture and the upper flat convolution of the spring resting on the top of the compressor bracket around the aperture.

References Cited by the Examiner

UNITED STATES PATENTS

| | | | |
|---|---|---|---|
| 1,191,175 | 7/16 | Grosz | 152—97 |
| 1,757,437 | 5/30 | Muldoon | 339—191 |
| 2,287,203 | 6/42 | Smith | 230—235 X |
| 2,349,845 | 5/44 | Cody | 230—58 |
| 2,643,109 | 6/53 | Wood | 267—69 X |
| 2,735,613 | 2/56 | Calling | 230—58 X |
| 3,022,832 | 2/62 | Marindin | 267—1 X |
| 3,058,705 | 10/62 | Hagg et al. | 248—20 |

FRANK B. SHERRY, *Primary Examiner.*